(12) United States Patent
Depelteau

(10) Patent No.: US 7,844,681 B2
(45) Date of Patent: Nov. 30, 2010

(54) NETWORK FILE SHARING METHOD AND SYSTEM

(75) Inventor: Robert Depelteau, Severna Park, MD (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/471,761

(22) Filed: Jun. 21, 2006

(65) Prior Publication Data

US 2006/0242264 A1 Oct. 26, 2006

Related U.S. Application Data

(63) Continuation of application No. 10/098,499, filed on Mar. 18, 2002, now Pat. No. 7,103,637.

(60) Provisional application No. 60/276,829, filed on Mar. 16, 2001.

(51) Int. Cl.
*G06F 15/167* (2006.01)
*G06F 15/16* (2006.01)

(52) U.S. Cl. .................. 709/212; 709/203; 709/232; 709/236

(58) Field of Classification Search ............... 709/212, 709/213, 232, 236, 203, 219, 230
See application file for complete search history.

(56) References Cited

U.S. PATENT DOCUMENTS

| | | | | |
|---|---|---|---|---|
| 5,218,695 A * | 6/1993 | Noveck et al. | ............... | 707/205 |
| 5,726,765 A * | 3/1998 | Yoshida et al. | ............... | 358/412 |
| 5,802,446 A * | 9/1998 | Giorgi et al. | ............... | 455/69 |
| 5,872,777 A * | 2/1999 | Brailean et al. | ............. | 370/349 |
| 5,884,097 A * | 3/1999 | Li et al. | ............. | 710/43 |
| 6,014,707 A * | 1/2000 | Miller et al. | ................. | 709/232 |
| 6,061,427 A * | 5/2000 | Ryoo | ...................... | 379/22.04 |
| 6,061,733 A * | 5/2000 | Bodin et al. | ................. | 709/233 |
| 6,098,128 A * | 8/2000 | Velez-McCaskey et al. | ... | 710/65 |
| 6,223,221 B1 * | 4/2001 | Kunz | ......................... | 709/224 |
| 6,272,534 B1 * | 8/2001 | Guha | ......................... | 709/216 |
| 6,324,581 B1 * | 11/2001 | Xu et al. | ...................... | 709/229 |
| 6,381,709 B1 * | 4/2002 | Casagrande et al. | ........... | 714/18 |
| 6,477,522 B1 * | 11/2002 | Young | ............................ | 707/2 |
| 6,594,701 B1 * | 7/2003 | Forin | ......................... | 709/232 |
| 6,647,058 B1 * | 11/2003 | Bremer et al. | ............... | 375/222 |
| 6,687,735 B1 * | 2/2004 | Logston et al. | ............. | 709/203 |
| 6,697,859 B1 * | 2/2004 | Takahashi | .................... | 709/225 |
| 6,701,372 B2 * | 3/2004 | Yano et al. | ................... | 709/232 |
| 6,765,868 B1 * | 7/2004 | Dunn et al. | .................. | 370/230 |
| 6,769,030 B1 * | 7/2004 | Bournas | ..................... | 709/233 |

(Continued)

*Primary Examiner*—Ario Etienne
*Assistant Examiner*—Sargon N Nano
(74) *Attorney, Agent, or Firm*—Van Pelt, Yi & James LLP

(57) ABSTRACT

A method for writing file data from client to server which comprises writing file data from a client to a server, wherein the client issues to the server a file transfer proposal that includes the names of a plurality of files to be transferred and attributes of each of the plurality of files. The server determines optimum memory locations for the plurality of files and optimum sequence and size of data transfer and issues to the client a request to transfer the plurality of files in a sequence that is optimized for memory location and minimal number of data transfers, thereby maximizing data transfer rate from the client to the server. Client computer, server computer, and network apparatus that are configured to implement the method are also disclosed.

23 Claims, 4 Drawing Sheets

U.S. PATENT DOCUMENTS

| | | | |
|---|---|---|---|
| 6,791,705 B1 * | 9/2004 | Sakamoto | 358/1.15 |
| 6,847,984 B1 * | 1/2005 | Midgley et al. | 707/204 |
| 6,904,474 B1 * | 6/2005 | Robertson | 710/33 |
| 7,058,014 B2 * | 6/2006 | Sim | 370/230 |
| 7,062,541 B1 * | 6/2006 | Cannon et al. | 709/219 |
| 7,103,637 B2 * | 9/2006 | Depelteau | 709/212 |
| 7,257,832 B2 * | 8/2007 | Beane et al. | 725/105 |
| 7,305,486 B2 * | 12/2007 | Ghose et al. | 709/232 |
| 7,330,904 B1 * | 2/2008 | Kleiman | 709/238 |
| 2002/0083185 A1 * | 6/2002 | Ruttenberg et al. | 709/232 |
| 2003/0046270 A1 * | 3/2003 | Leung et al. | 707/1 |
| 2003/0187852 A1 * | 10/2003 | Abe et al. | 707/10 |
| 2007/0208865 A1 * | 9/2007 | Morris et al. | 709/228 |

* cited by examiner

KNOWN ART

KNOWN ART

KNOWN ART

NETWORK FILE SHARING METHOD AND SYSTEM

CROSS REFERENCE TO OTHER APPLICATIONS

This application is a continuation of co-pending U.S. patent application Ser. No. 10/098,499, entitled NETWORK FILE SHARING METHOD AND SYSTEM filed Mar. 18, 2002 now U.S. Pat. No. 7,103,637 which is incorporated herein by reference for all purposes, which claims priority to U.S. Provisional Application No. 60/276,829 filed Mar. 16, 2001 which is incorporated herein by reference for all purposes.

FIELD OF THE INVENTION

The present invention relates to the field of storage area networks serving computer file server systems and client computers, and more particularly, to methods of transferring data between the client and server.

BACKGROUND OF THE INVENTION

FIG. 1 shows a typical storage area network 100 serving client computer 102 and computer file server system 104. Client 102 and server 104 are in communication via network 106.

Client computer 102 can include a processor 108 coupled via bus 110 to network port 112, fiber port 114 and memory 116. Processor 108 can be, for example, an Intel Pentium® 4 processor, manufactured by Intel Corp. of Santa Clara, Calif. As another example, processor 108 can be an Application Specific Integrated Circuit (ASIC). An example of bus 110 is a peripheral component interconnect ("PCI") local bus, which is a high performance bus for interconnecting chips (e.g., motherboard chips, mainboard chips, etc.), expansion boards, processor/memory subsystems, and so on.

Network port 112 can be an Ethernet port, a serial port, a parallel port, a Universal Serial Bus ("USB") port, an Institute of Electrical and Electronics Engineers, Inc. ("IEEE") 1394 port, a Small Computer Systems Interface ("SCSI") port, a Personal Computer Memory Card International Association ("PCMCIA") port, and so on. Memory 116 of client computer 102 can store a plurality of instructions configured to be executed by processor 108. Memory 116 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof.

Client computer 102 can be coupled to server computer 104 via network 106. Server 104 can be, for example, a Windows NT server from Hewlett-Packard Company of Palo Alto, Calif., a UNIX server from Sun Microsystems, Inc. of Palo Alto, Calif., and so on. Server 104 can include a processor 118 coupled via bus 120 to network port 122, fiber port 124 and memory 126. Examples of network port 122 include a Wide Area Network (WAN), a Local Area Network (LAN), the Internet, a wireless network, a wired network, a connection-oriented network, a packet network, an Internet Protocol (IP) network, or a combination thereof.

As used to describe embodiments of the present invention, the terms "coupled" or "connected" encompass a direct connection, an indirect connection, or any combination thereof. Similarly, two devices that are coupled can engage in direct communications, in indirect communications, or any combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Storage area network 100 includes a plurality of networked storage devices 128 accessible via fiber router 130. Networked storage devices 128 may include, for example, one or more hard disk drives 132, 134, and 136, optical storage device 138, removable storage device 140, or other such storage devices. Fiber router 130 may be, for example, Chaparal FVS113, Crossroads 4250, ATTO Fiber Bridge 3200. Information stored on storage devices 128 may be accessible to client computer 102 and server computer 104 as if the devices were directly attached to the computers. For example, storage area on disk 132 may be "mounted" on server 104 and storage area on disk 134 may be mounted on client 102. From the perspective of applications running on those computers, the storage areas will appear as if they are directly attached to the respective computer system.

In typical client-server environments, a client computer may need to read data stored on the server system or may need to write data to the server system. Conventional systems and methods for accomplishing such tasks have not been optimized to take advantage of storage area networks such as those shown in FIG. 1. For example, a conventional process for writing data from the client into a file on a server follow a communications flow shown in FIG. 2. In this example, client 102 has data stored on disk 132 that needs to be transferred for storage by server 104. In FIG. 2, the transactions that are represented by solid lines consist of messages or data that is sent between the client and server computers. The dashed lines represent the actual interaction between client 102 and server 104 and networked storage devices 128 accessed via router 130.

In step 201, client 102 initiates a data write request by informing server 104 that the client has data to be written to a file maintained by server 104. In step 202, server 104 creates a new empty file on one of the networked storage devices 128, such as hard disk 134. In step 203, server 104 sends a message to client 102 informing client 102 that a file has been created. In steps 204 and 205, client 102 retrieves data from hard disk 132. In step 206, client 104 sends the data to server 104 with instructions to write the data to the new file. In step 207, server 104 writes the data to the new file on hard disk 134. In steps 208-215, client 102 retrieves data and server 104 writes data as described until all of the data has been transferred from client 102 to server 104.

This conventional method of data transfer does not result in an efficient file transfer between the two systems. Particularly, as shown in FIG. 2, the communications flow is not optimized because data that only needs to be moved from one physical location to another physical location within a single storage area network 100 is instead transferred out of the storage area network. Specifically, the data flows from storage area network 100 to client 102 via router 130. Client 102 then transfers the data to server 104 via network 106. Server 104 finally transfers the data back to storage area network 100 via router 130.

Another inefficiency problem associated with conventional file transfer systems is that the server cannot optimize its storage of the data because it does not have enough information to manage the data transfer operation. This is applicable to storage area networks such as those shown in FIG. 1, as well as client-server systems wherein data is stored in locally-attached storage devices. Initially, the client requests that the server create a new, empty file. The server responds when it has done so. From that point onward, the client writes a subset of the file's total data in each of a sequence of write operations. The server may or may not acknowledge the receipt of the data, depending on the specifics of the protocol used. Similarly, when the client has written all the file's data to the file on the server, it may issue a final request or not, depending on the protocol used.

FIG. 3 illustrates the above-described inefficiency problem in more detail. In step, client 300 initiates a request to transfer data to server 301. In step 303, server 301 responds to the request by indicating that a new empty file has been created. In steps 304-305, client 300 sends one or more data packets until the entire file has been transferred from client 300 to server 301. Because server 301 does not have complete information about the data being transferred, the data is subsequently written to the new file in pieces of varying size. This may result in an inefficient utilization of available disk space. If multiple files are to be transferred, then steps 302-306 must be repeated, as shown in steps 307 and 308.

The conventional method as described is widely used for populating the data space of a file, and is effective when the number and content of the data cannot be known in advance. However, because the server is only exposed to a subset of the total set of write data operations at any given time, the server's opportunities for optimization are limited. Particularly, the server cannot determine which available storage locations within a storage medium would best be suited for storage of the file, because the file's ultimate size is unknown. Further, the server cannot specify the order that the client should send the data, or, in cases where the client will ultimately send more than one file to the server, the sequence of the files. This deficiency is particularly pronounced in storage area networks, where it is typical for a client to transfer numerous files having particular contents and sizes known only to the client. In such environments, the transfer of file contents on a piecemeal basis results in a diminished data transfer rate.

Another serious limitation in utilizing the conventional methods of transferring data as illustrated in FIGS. 2 and 3 arises when files are to be moved from a client to one or more removable-media devices on a server. In such systems, a server may manage a series of pieces of media, each of which has finite capacity. As data is placed on these media, each piece may have a different amount of space remaining. When these method are employed, and data is written in a piecemeal manner, a server may store a file's data on a piece of media where it will ultimately not fit. In such a situation, it may be necessary to later move the partially-written file to a new location so that further write operations may take place.

Accordingly, there is a need for a system and method for providing improved file transfer rates and efficient data placement on a data storage medium.

The general process for transferring data between client and server systems, described above, is also used in common network file sharing protocols, such as Network File Systems (NFS) and Common Internet File System (CIFS), wherein a client computer creates an empty file on a server, then writes data piecemeal to the file via the server.

SUMMARY OF THE INVENTION

It is an object of the present invention to improve the data transfer rate between a client and a server in a computer network.

It is another object of the invention to improve the use of a third party copy feature of storage networks wherein the client and server exchange information regarding a set of data blocks to be transferred and delegate the transfer to a third party, thereby improving the data transfer rate and relieving the server and client load.

A further object is to reduce the number of steps needed to move files from a client to one or more removable media devices on a server.

Another object is to improve the utilization of removable media.

These objects, and others which will become apparent from the following disclosure are achieved by the present invention which in one aspect comprises a method and system for writing file data from client to server which comprises issuing by the client to the server a file transfer proposal which comprises the names of a plurality of files and attributes of each of the plurality of files, determining by the server optimum memory locations for the plurality of files and optimum sequence and size of data transfer, issuing by the server to the client a request to transfer the plurality of files in a sequence which is optimized for memory location and minimal number of data transfers, thereby maximizing data transfer rate from the client to the server.

DETAILED DESCRIPTION OF INVENTION

As described above, the problems associated with conventional file transfer methods stems from the fact that the transfer is initiated from the client. As a result, too little information is available to efficiently place the files in storage media managed by the server system. Another problem with conventional file transfer methods is that too little information is available to make proper use of the so-called "third-party copy" feature of storage area networks. In the third-party copy scenario, the client and server need to identify the data blocks to be transferred from one system to the other. This information must then be provided to a third party, which issues the corresponding storage are network I/O operations effect the movement data. In order to write data from the client to the server, the party initiating the third-party copy must be aware of the locations (block addresses) of data on both the client and server. When write operations are performed piecemeal, initiated by the client, the server has not yet had an opportunity to allocate space for the anticipated data. Accordingly, the third-party copy feature cannot be used.

According a first embodiment of the present invention, a new method for writing data to one or more files from a first computer to a second computer is disclosed whereby information describing the one or more files is first sent from the first computer system to the second computer system before the data is transferred. Based upon this information, the second computer system requests file data from the client in a manner optimized according to the second computer's needs. That is, the second computer may dictate the order, time, and the communication medium for completing the data transfer. As a result, the server is enabled to optimize the placement and transfer of data.

Figure 1:
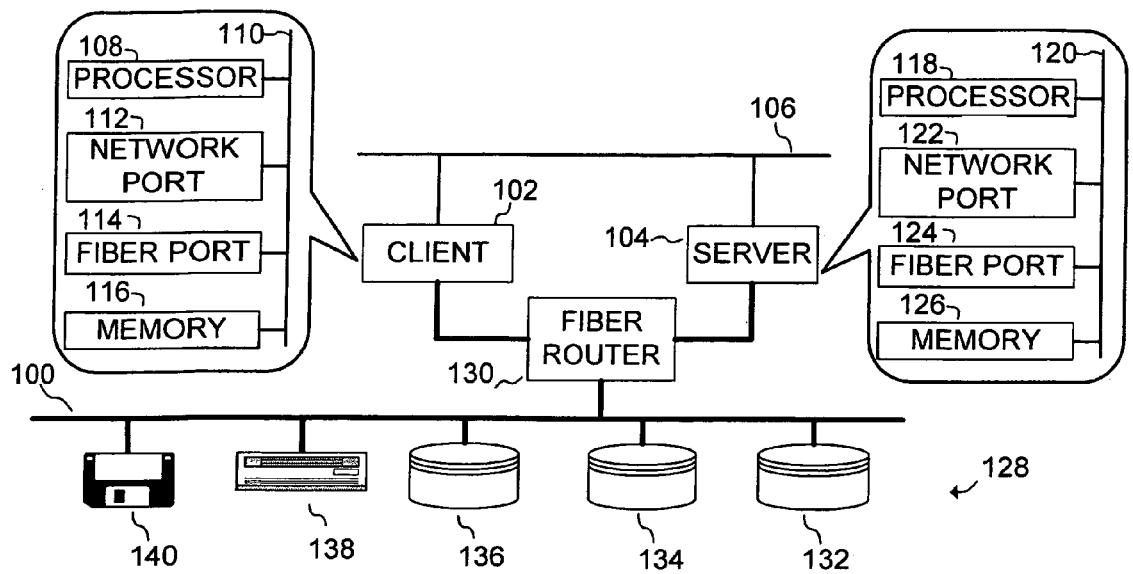
FIG. 1 is a schematic diagram of a conventional architecture in which the present invention may be implemented to improve file transfers between client and server systems using storage area network devices.
Figure 2:
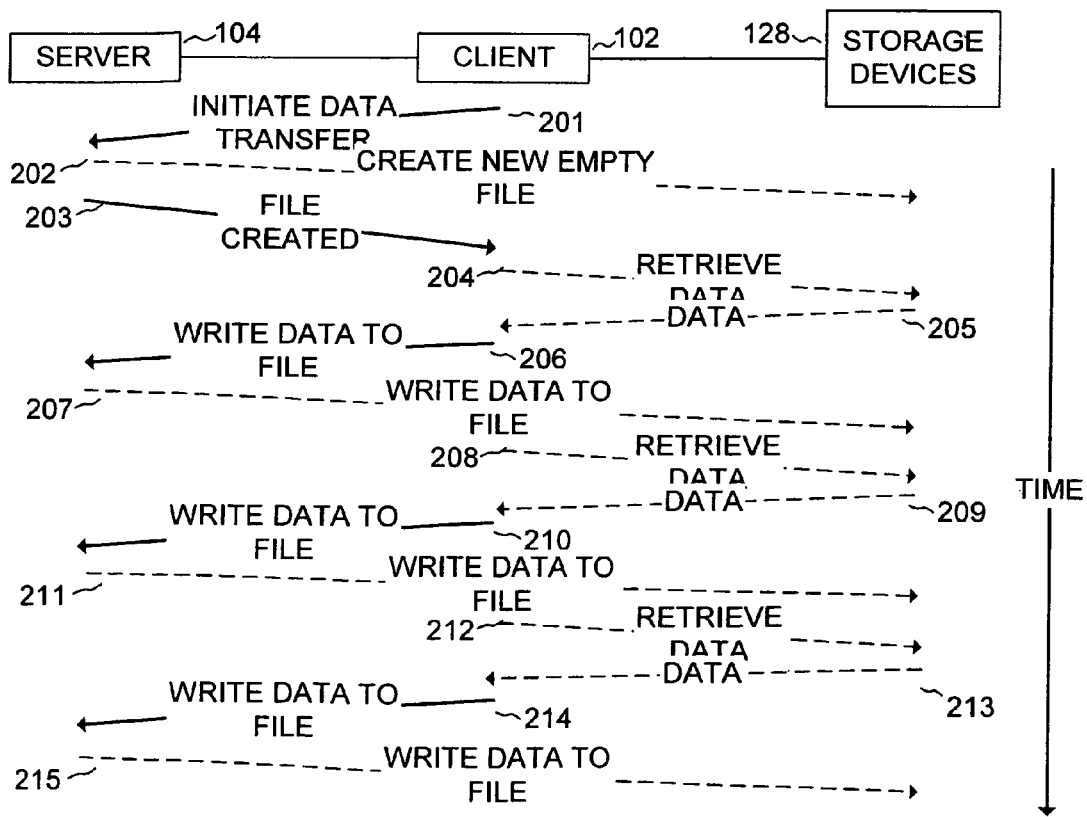
FIG. 2 is a timeline illustrating transactions between a client system, a server system, and a storage area network for writing data to a file according to conventional methods.
Figure 3:
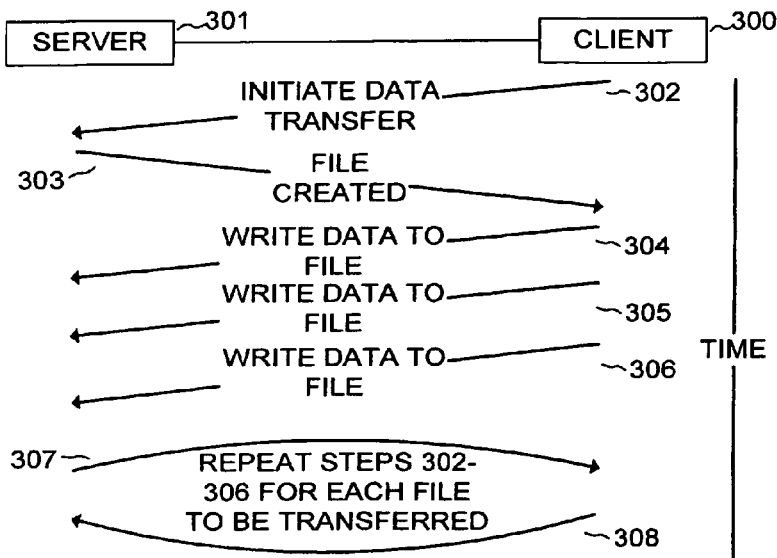
FIG. 3 is a timeline illustrating transactions between a client system and a server system for writing data to multiple files according to conventional methods.
Figure 4:
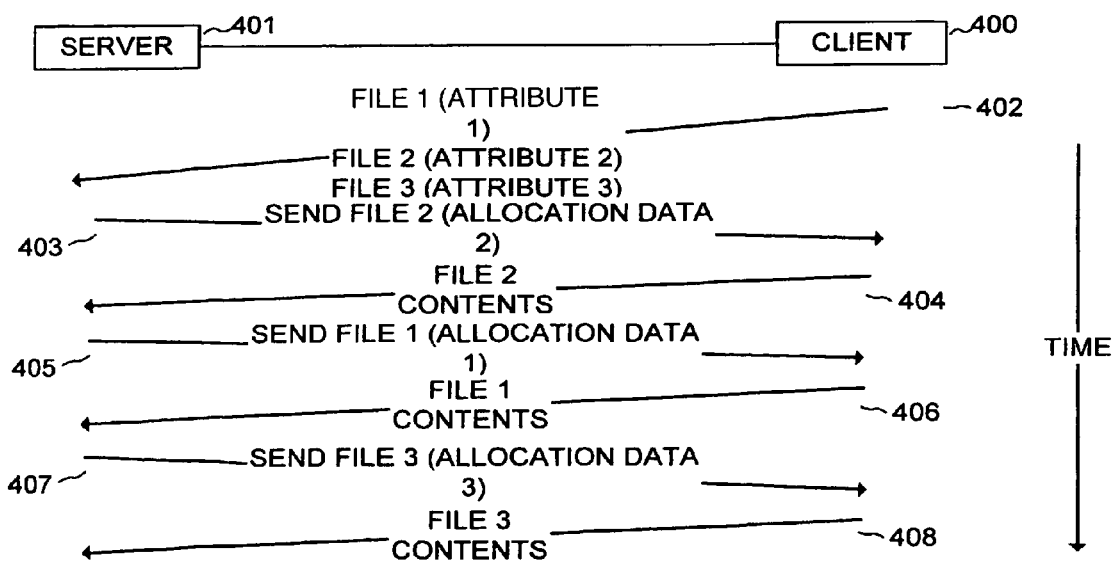
FIG. 4 is a timeline illustrating transactions between a client system and a server system for writing data to multiple files according to an embodiment of the present invention.

FIG. 4 illustrates a new method for transferring one or more files from one system to another according to an embodiment of the present invention. In FIG. 4, a user of client 400 desires to transfer three files to server 401, designated File1, File2, and File3. The client proposal to transfer all three files is sent to the server, along with such attributes for each file as to best facilitate the transfer. These attributes may include, for example, the file length and the location on a network storage device of each of the data blocks that compose the file. In the example, server 401 processes the request to transfer these three files, and determines that an optimal performance could be obtained by transferring the files in the order of File2, followed by File1 and File3, respectively. The order that is determined will optimize the data transfer by reducing the disk head seeking. Accordingly, in step 403, server 401 instructs client 400 to send the contents of File2. In step 404, client 400 sends the contents as requested. In steps 405 and 406, data for File1 is requested and sent, as shown in FIG. 4. Similarly, in steps 407 and 408, data for File3 is requested and transferred. The file transfer request may include allocation data to further improve the file transfer process. Allocation data may be comprised of, for example, the addresses on a storage area network device to which the data are to be transferred, at maximum data transfer rate. Allocating data may also include a scatter gather list of the block as they are allocated on the disk.

A first improvement resulting from the invention is an ability of the second computer, which in this example is server 401, to prepare for a transfer size of its choosing. Using conventional methods, the first computer, in this case, client 400, must assume that the other computer can accept a data transfer of a particular size. The need to make this assumption typically means that the sending system must make a conservative choice so as not to exhaust memory resources on the recipient system. In contrast, using methods of the present invention, the recipient system receives, in advance, the size of the data to be transferred (because of the file attributes sent by client 400), an so server 401 can prepare for as large a transfer as possible and inform the sending system (via the allocation data). In this way, it is possible to affect the transfer of a single file with a minimum number of data transfers and without exhausting the resources of the server. This maximizes the data transfer rate from client to server within the server's resource constraints.

A second improvement accomplished by the invention results because the server controls the sequence of files to be transferred. In removable media systems, such as those involving storage libraries, it is typical to optimize performance by placing particular files on particular pieces of media. Further, it is often the case that at any particular time, some pieces of media can be accessed more quickly than others. Continuing the example of FIG. 4, at the time that the transfer of File1, File2, and File3 is requested, it may be that the piece of media that is to hold File2 can be accessed most quickly. In this case, it would be advantageous to transfer File2 before either of the other files. The method embodied by the invention renders this possible by presenting all choices to the server at once and allowing it to determine the sequence that optimizes performance.

Figure 5:
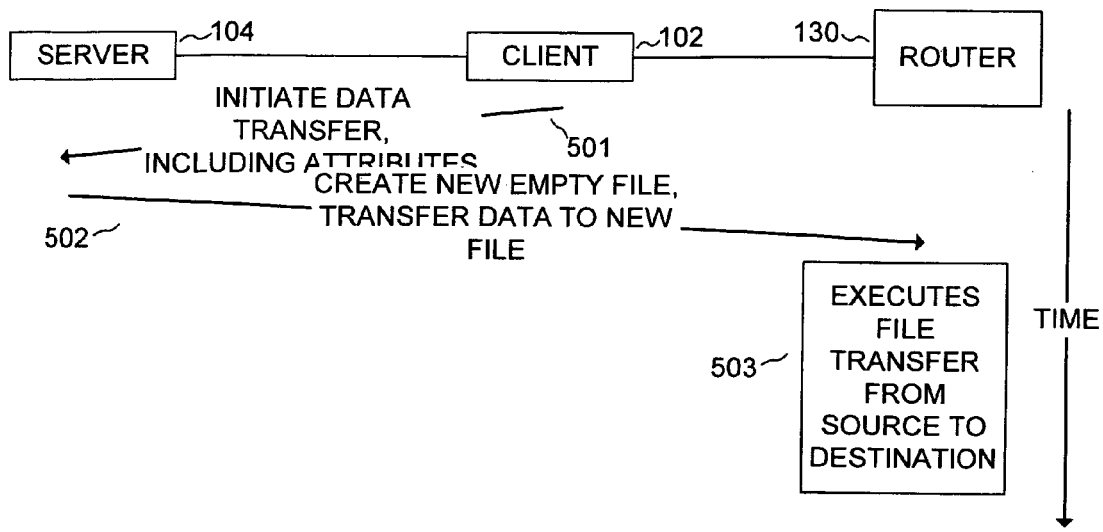
FIG. 5 is a timeline illustrating transactions between a client system, a server system, and a storage area network for writing data to a file according to an embodiment of the present invention.
Figure 6:
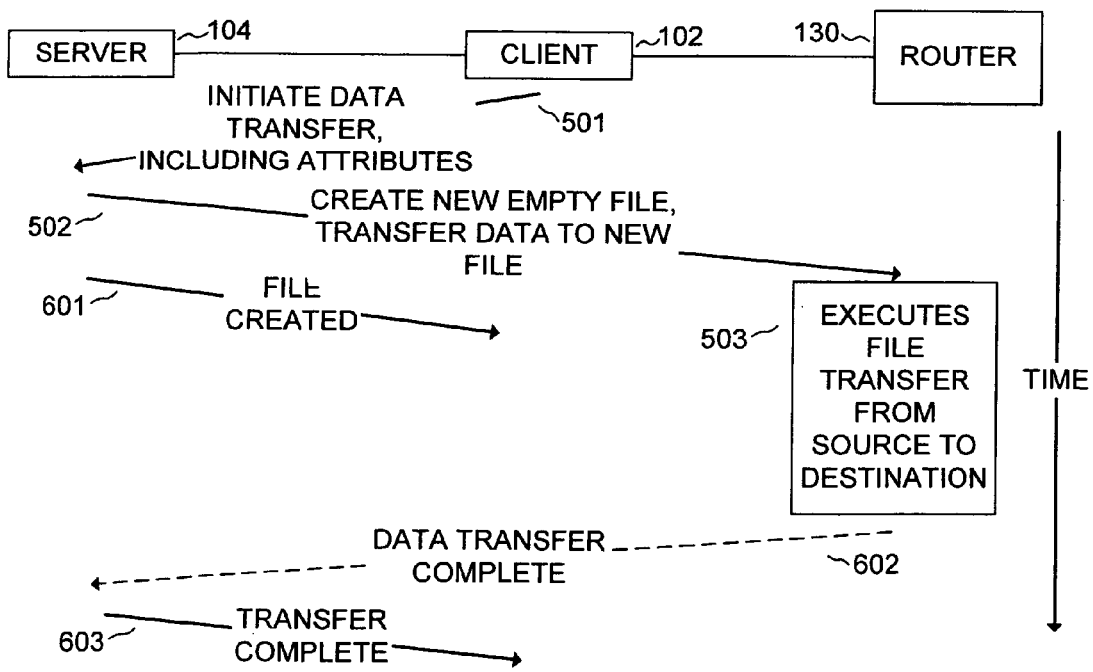
FIG. 6 is a timeline illustrating transactions between a client system, a server system, and a storage area network for writing data to a file according to another embodiment of the present invention.
Figure 7:
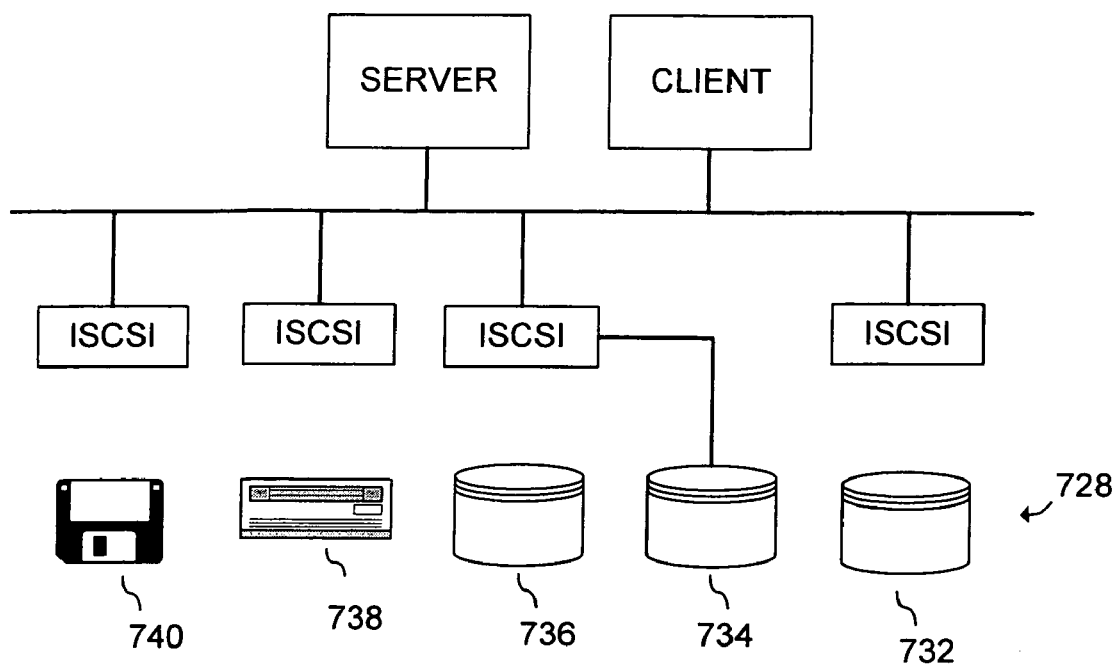
FIG. 7 is a schematic diagram of an architecture in which the present invention may be implemented to improve file transfers between client/server systems utilizing storage devices networked according to an ISCSI architecture.

A third improvement results because the client and server can exchange information needed to perform third-party copy operations. Such operations are widely recognized for performance optimization because a data transfer can take place through a third-party agent without expending any resources by either client or server in the data transfer. FIGS. 5 and 6 illustrate how the present invention facilitates third-party copy operations. As shown in FIGS. 5 and 6, the present invention provides for a significantly simplified interaction between the client, server, and storage area network. According to the present invention, data need not be transferred out of storage area network 100 to complete the file transfer. Instead, router 130 is instructed to carry out the file transfer operation within the storage area network.

FIG. 5 illustrates the interaction between client 102, server 104, and storage devices 128 according to an embodiment of the present invention to perform third party copy operations. In this embodiment, no acknowledgment messages are passed between the systems. In step 501, client 102 sends a message to server 104 to initiate a file transfer. The initial message includes attributes of the file that is to be transferred, which is also referred to herein as "the source file." As described above, attributes may include information such as the size and location of the source file. In this embodiment, the location of the source file further includes identification of actual data sectors on the storage medium indicating every component of data comprising the file. This information is commonly referred to in the art as "scatter-gather" data because it identifies the physical locations in which data is scattered across the storage medium and is needed to retrieve the data. The information is sent to the client in a copy request, and is stored in the request packet.

In step 502, server 104 instructs router 130 to create a new empty file and to carry-out the data transfer from the source file to the new empty file, which then becomes the destination file. A message created in step 502 includes one or more of the file attributes received from client 102. In step 503, router 130 transfers the data from the source location to the destination location. That is, router 130 retrieves data from the sectors identified in the scatter-gather list and places them in available sectors on the destination storage medium. The sectors making up the new file are included in the destination file's header block for future reference as scatter-gather data.

FIG. 6 shows another example implementing the present invention to facilitate third-party transfers of data. This example includes all of the steps shown in FIG. 5, in additional steps 601-603. In step 601, server 104 sends a confirmation message back to client 102. The confirmation informs client 102 that the new file has been created. In step 602, which is performed after the data transfer has been completed by router 130, router 130 sends a message to server 104. Message 602 informs server 104 that the data transfer has been successfully completed. In step 603, server 104 informs client 102 of the successful completion of the data transfer.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for transferring a file, comprising:
   receiving from a sending device a file transfer proposal that includes information describing a file to be transferred from the sending device to a destination device at which the file is to be transferred, the information includes the size of the file to be transferred;
   determining at the destination device, prior to the content of the file being transferred and based at least in part on the information describing the file including the size of the file to be transferred, a storage location at the destination device for the file to be transferred to;
   receiving, at the destination device, the content of the file; and
   storing the content of the file in the previously determined storage location at the destination device.

2. A method as recited in claim 1, further comprising issuing to the sending device, subsequent to determining the storage location, a file transfer request to cause transfer to be initiated.

3. A method as recited in claim 1, wherein the information describing the file indicates a size of the file and determines the storage location including determining based at least in part on the size of the file a location in which the entire file can be stored contiguously.

4. A method as recited in claim 1, wherein the sending device and/or the destination device is/are associated with a storage area network.

5. A method as recited in claim 1, wherein the destination device is associated with a server.

6. A method as recited in claim 1, wherein:
   the destination device includes a plurality of pieces of media; and
   determining includes selecting from the plurality of pieces of media.

7. A method as recited in claim 1 further comprising determining at least one of the following: a file transfer sequence, a block transfer sequence, and/or a data transfer size.

8. A method as recited in claim 1, wherein a plurality of files are to be transferred and the method further comprises determining a file transfer sequence based at least in part on time(s) associated with retrieving the plurality of files from the sending device.

9. A method as recited in claim 1, wherein a plurality of files are to be transferred and the method further comprises determining a file transfer sequence based at least in part on time(s) associated with storing the plurality of files on the destination device.

10. A method as recited in claim 1 further comprising transferring the file using a third party other than the destination device or the sending device.

11. A method as recited in claim 1, wherein the file to be transferred includes a plurality of blocks and the storage location includes a plurality of block locations associated with the destination device for the plurality of blocks to be transferred to.

12. A method as recited in claim 1, wherein the information describing the file includes at least one of (1) a size of the file to be transferred or (2) one or more locations of data block(s) that compose the file to be transferred.

13. A method as recited in claim 1, wherein the information describing the file includes one or more additional attributes of the file.

14. A system for transferring a file, comprising:
   a processor; and
   a memory coupled with the processor, wherein the memory is configured to provide the processor with instructions which when executed cause the processor to:
      receive from a sending device a file transfer proposal that includes information describing a file to be transferred from the sending device to a destination device at which the file is to be transferred, the information includes the size of the file to be transferred;
      determine at the destination device, prior to the content of the file being transferred and based at least in part on the information describing the file including the size of the file to be transferred, a storage location at the destination device for the file to be transferred to;

receive, at the destination device, the content of the file; and store the content of the file in the previously determined storage location at the destination device.

15. A system as recited in claim 14, wherein the sending device and/or the destination device is/are associated with a storage area network.

16. A system as recited in claim 14, wherein the memory is configured to provide the processor with further instructions for determining at least one of the following: a file transfer sequence, a block transfer sequence, and/or a data transfer size.

17. A system as recited in claim 14, wherein the memory is configured to provide the processor with further instructions for transferring the file using a third party other than the destination device or the sending device.

18. A system as recited in claim 14, wherein the file to be transferred includes a plurality of blocks and the storage location includes a plurality of block locations associated with the destination device for the plurality of blocks to be transferred to.

19. A computer program product for transferring a file, the computer program product being embodied in a computer readable storage medium and comprising computer instructions for:

receiving from a sending device a file transfer proposal that includes information describing a file to be transferred from the sending device to a destination device at which the file is to be transferred, the information includes the size of the file to be transferred;

determining at the destination device to which, prior to the content of the file being transferred and based at least in part on the information describing the file including the size of the file to be transferred, a storage location at the destination device for the file to be transferred to;

receiving, at the destination device, the content of the file; and storing the content of the file in the previously determined storage location at the destination device.

20. A computer program product as recited in claim 19, wherein the sending device and/or the destination device is/are associated with a storage area network.

21. A computer program product as recited in claim 19, the computer program product further comprising computer instructions for determining at least one of the following: a file transfer sequence, a block transfer sequence, and/or a data transfer size.

22. A computer program product as recited in claim 19, the computer program product further comprising computer instructions for transferring the file using a third party other than the destination device or the sending device.

23. A computer program product as recited in claim 19, wherein the file to be transferred includes a plurality of blocks and the storage location includes a plurality of block locations associated with the destination device for the plurality of blocks to be transferred to.

* * * * *